Aug. 2, 1955 J. E. COOLIDGE ET AL 2,714,698
MOTOR OPERATED RESET CONTROL APPARATUS
Filed Aug. 5, 1950 2 Sheets-Sheet 2

INVENTORS
John E. Coolidge
Howard F. Anderson
BY
Pennie, Edmonds, Morton and Barrows
ATTORNEYS

United States Patent Office 2,714,698
Patented Aug. 2, 1955

2,714,698

MOTOR OPERATED RESET CONTROL APPARATUS

John E. Coolidge, Waterbury, and Howard Francis Anderson, Torrington, Conn., assignors to The American Brass Company, a corporation of Connecticut Application August 5, 1950, Serial No. 177,848

7 Claims. (Cl. 318—265)

This invention relates to an electric control apparatus for returning a pair of spaced members to a predetermined spaced setting with respect to each other after they have taken part in an operation during which they have been moved relative to each other. More particularly, the invention is concerned with an electric control apparatus for resetting a pair of spaced members which during an operation have been moved toward or away from each other by an electric motor in response to either manual control or to a spacing control apparatus which continuously registers the results of the operation during the operation and causes the motor to operate to move the members either together or apart depending upon those results measured during the operation.

One of the difficulties which arises in the use of such a pair of spaced members is that after they take part in one operation they are frequently not at the same relative spacing with respect to each other as they were at the beginning of the operation because of their movement by the electric motor during the operation. Hence their use in succeeding operations will be initiated under different conditions. It is the object of this invention to reset the spaced members after they have taken part in each operation to the same predetermined spaced setting which obtained prior to their taking part in such operation.

To this end the electric control apparatus of the invention comprises means driven by the electric motor for registering the net operation of the electric motor in either direction during the operation in which the spaced members take part. This registering means is set to register zero net operation for the motor when the members are at their normal or predetermined relative spaced setting. The apparatus includes a source of current and an electric circuit and means for connecting the electric circuit to the source of electric current at the termination of the operation in which the spaced members take part. A switch mechanism is provided in said circuit and is adapted to be operated by said registering means to connect the electric motor to a power source for operation in one direction or the other when at the termination of the operation in which the spaced members take part the registering means indicates that the motor has had a positive net operation during this time. The connection of the electric motor to the power source serves to energize the motor to move the spaced members by rotation of the motor in one direction or the other until the registering means indicates that the spaced members are at the same relative spacing as prior to the initiation of the operation in which they take part.

The invention also contemplates the provision of means for resetting the registering means to a new zero registration when for any reason it is desired to change the normal or predetermined spaced setting of the spaced members during the course of an operation in which they are taking part.

A particularly advantageous use of the new electric control apparatus is in conjunction with rolling mills, for rolling sheet or strip metal, for the purpose of returning the rolls of the mill to their normal relative spacing, which obtained prior to the entry of a bar into the mill, only after a bar has left the mill.

In rolling sheet or strip metal, for example in rolling copper and brass sheet or strip to thin gauges, it is necessary after successive passes of the metal through the rolls (each of which passes reduces its thickness somewhat) to anneal the metal before it can be further rolled. In commercial practice the annealed strip or the strip from a previous rolling operation commonly has some sections that are harder and other sections that are softer than the normal hardness of the strip. When relatively hard sections of the strip enter between the rolls on succeeding passes the rolls must be screwed closer together in order to keep the thickness of the emerging strip constant, and when relatively soft sections enter between the rolls they must be screwed apart to prevent making the strip too thin. This screwing together or apart of the rolls is generally effected by an electric screw-down motor or motors controlled (1) by the operator of the mill by observation of a visual thickness indicating means or (2) by an automatic motor control apparatus responsive to a thickness gauge such as an X-ray thickness gauge. Such an automatic control apparatus is disclosed in copending application Serial No. 143,136, filed February 8, 1950, in the names of William R. McCaulay and Howard F. Anderson and assigned to the assignee of this application.

Whether the spacing of the rolls of the rolling mill is under the manual control of the operator of the mill or is automatically controlled by an apparatus such as disclosed in the above copending application, it frequently occurs that the relative spacing of the rolls after a bar has been rolled is different from their relative spacing prior to the entry of the bar into the mill. This may result because of the necessity for increasing or decreasing the rolling pressure as a result of hard or soft sections in a bar and therefore moving the rolls closer together or farther apart and/or because of the override in a manual control and in some types of automatic controls. In order that successive bars which are to be rolled to uniform thicknesses may be readily and uniformly so rolled it is desirable, if not necessary, that the relative spaced setting of the rolls prior to the entry of each bar into the mill be the same.

The type of electric control apparatus contemplated by the invention for use in resetting the rolls of a rolling mill broadly comprises position-responsive means driven by the screw-down motors of the rolling mill for registering the net operation of the motors in either direction during the rolling of a bar. This position-responsive means is set to register a zero net operation of the motors when the rolls of the mill are at the normal or predetermined relative spacing which is to obtain prior to the entry of a bar into the mill. Also included in the apparatus is an electric circuit and means for connecting it to a source of current when a bar leaves the mill, this means at the same time serving to discontinue the operation of the automatic thickness control apparatus if such a control is being used. The electric circuit contains a switch mechanism which is adapted to be operated by the aforementioned position-responsive means to connect the screw-down motors to an electric power source in such a way that the screw-down motors are operated either to move the rolls together or to move them apart depending upon whether the position-responsive means indicates that during the rolling of the bar the motors have been operated to effect a net decrease or increase from the norm in the relative spaced setting of the rolls. The operation of the switch mechanism by the position-responsive means also is such that when a zero net operation of the motors during the rolling of a bar is registered the control apparatus does not effect operation of the screw-down motors in either direction and furthermore is such that, when for instance a positive net operation is indicated and the control apparatus therefore effects operation of the screw-down motors to move the rolls toward each other, such operation will be terminated when the rolls of the mill have again arrived at their normal spaced setting.

Frequently, during the course of rolling a bar under automatic control it is desirable to adjust the rolls of the mill to a new normal spaced setting in order to obtain a better thickness gauge indication. For instance, if it is found that bars are running overly thick and the automatic thickness control apparatus is therefore constantly operating to move the rolls closer together it will be desirable to readjust the rolls to a new normal spaced setting closer to each other whereby the automatic thickness control apparatus may not need to be continuously operating to obtain the desired thickness in the rolled bar. It is, therefore, contemplated that the control apparatus also include means for resetting the position-responsive means to a new zero registration during the rolling of a bar when it is desired at this time to change the normal setting of the rolls.

One form of electric control apparatus according to the invention will be more specifically described in connection with a rolling mill operation and in connection with the accompanying drawings in which.

Figure 1:
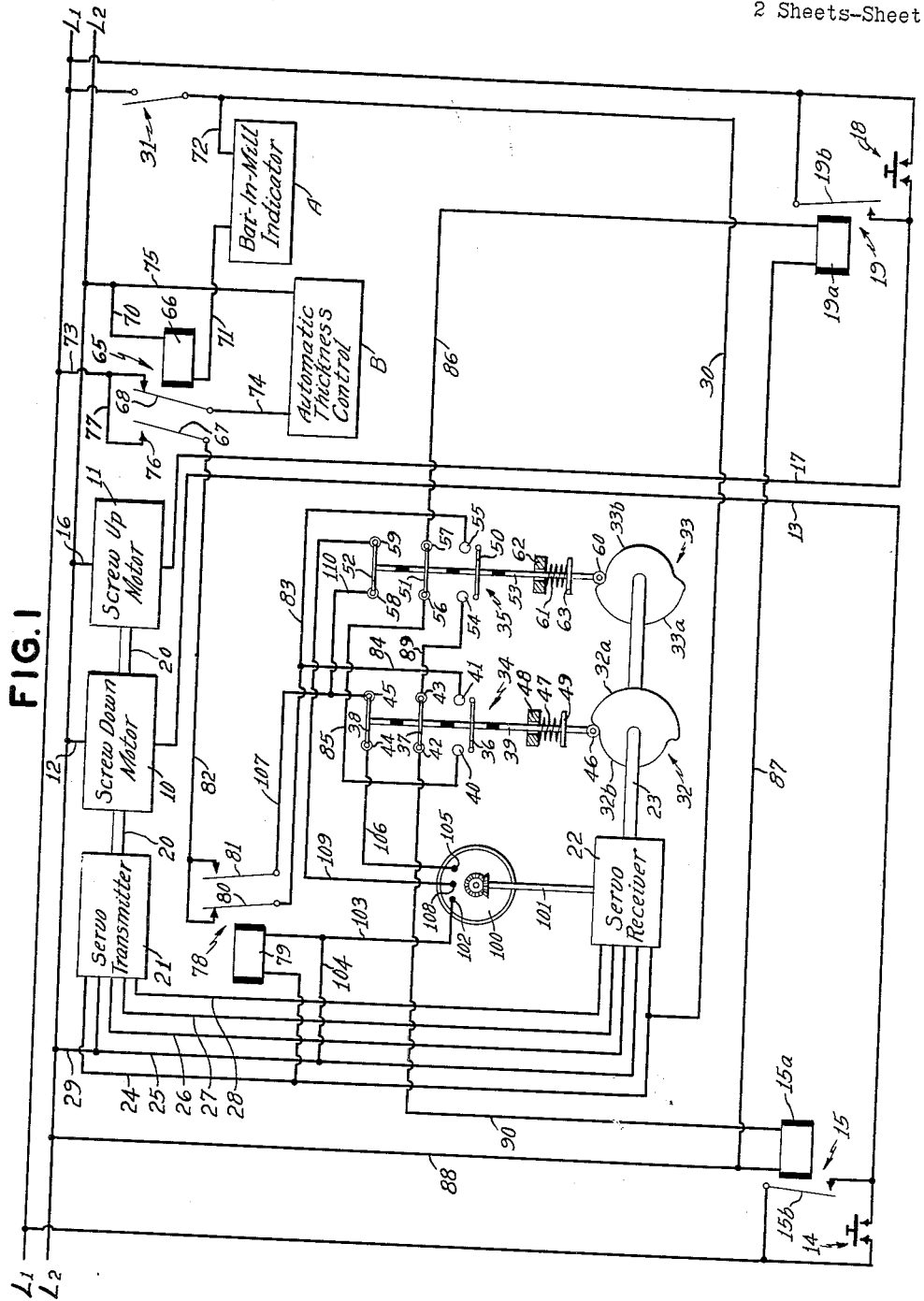
Fig. 1 is a diagrammatic illustration of the apparatus.

In Fig. 1 there are illustrated two motors 10 and 11 which are respectively labeled as a screw-down motor and a screw-up motor. This showing of two motors is merely for convenience, it being understood, of course, that a single reversible motor might be employed instead, or where a plurality of motors is employed each might be a reversible motor. These motors by appropriate connection (not shown) are adapted to adjust the relative spacing of the rolls (not shown) of a rolling mill. As a general rule the lower roll in a rolling mill is immovable, and so the screw-down motors normally only adjust the positioning of the upper roll. The screw-down motor 10 is adapted to be supplied with electric current from power lines L1 and L2, representing a source of current, by a conductor 12 leading to the power line L2 and by a conductor 13 leading to the power line L1 through either a push button 14 or a relay 15, as will be subsequently described. The screw-up motor 11 is likewise adapted to be provided with electric current from the power lines L1 and L2 through a conductor 16 connected with the power line L2 and a conductor 17 connected to the power line L1 through either a push button 18 or a relay 19, as will also be subsequently described.

As represented in the drawing, the screw-down motor 10 and screw-up motor 11 drive a common shaft 20 which may be connected by appropriate gearing to a shaft for moving the rolls, or upper roll, of the mill, as the case may be. Through suitable gearing (not shown) a servo transmitter 21 (such as a well known Selsyn transmitter) is connected to and driven by shaft 20. A servo receiver 22 (similarly, such as a well known Selsyn receiver), driving through suitable gearing (not shown) a cam shaft 23, is electrically connected with the servo transmitter 21 by conductors 24, 25, 26, 27, 28. The servo transmitter 21 and the servo receiver 22 are adapted to be electrically locked together by reason of the connection of the connecting conductor 25 with the power line L2 of the power source by a conductor 29 and by reason of the connection of connecting conductor 24 with the power line L1 by a connecting conductor 30 and a master switch 31. As will be readily understood, when the servo transmitter 21 and the servo receiver 22 are locked together by the closing of master switch 31, as shown in the drawing, any rotation of drive shaft 20 by either the screw-down motor 10 or the screw-up motor 11 will cause a corresponding rotation of cam shaft 23.

A pair of substantially circular cams 32 and 33 are fixedly secured to the cam shaft 23. The cams 32 and 33 are each provided with dwells 32a and 33a respectively of slightly less than 180 degrees and are so secured to the cam shaft 23 that their dwells lie on opposite sides radially of the shaft and at least a small portion of the inoperative (depressed) part of each cam surface 32b and 33b lies in the same position with respect to the cam shaft as does a corresponding small portion of the inoperative part of the other cam.

A pair of multiple switches indicated generally at 34 and 35 are adapted to be operated respectively by cams 32 and 33. Switch 34 comprises three switch arms 36, 37 and 38 supported by a rod 39 of insulating material and adapted respectively to connect pairs of contacts 40 and 41, 42 and 43, and 44 and 45. A cam follower 46 is carried by the lower end of rod 39 and is maintained in contact with the surface of cam 32 by a spring 47 surrounding the switch rod 39 and compressed between an immovable stop 48 and a cross bar 49 carried by the switch rod 39. Multiple switch 35 is identical with multiple switch 34 and comprises three switch arms 50, 51 and 52 supported by a rod 53 of insulating material and adapted respectively to connect pairs of contacts 54 and 55, 56 and 57, and 58 and 59. A cam follower 60 supported by the lower end of switch rod 53 is maintained in contact with cam 33 by a spring 61 surrounding the switch rod 53 and compressed between an immovable stop 62 and a cross bar 63 supported on the switch rod 53. As shown in Fig. 1 the switches 34 and 35 are in what will be termed their inoperative positions, that is, in their positions at which contacts 42 and 43, 44 and 45, 56 and 57, and 58 and 59 are respectively electrically connected together in pairs and contacts 40 and 41 and contacts 54 and 55 are not connected.

Multiple switch 34 controls the automatic operation of screw-down motor 10 by controlling the operation of relay 15 while multiple switch 35 controls the automatic operation of screw-up motor 11 by controlling the operation of relay 19.

As has been stated previously the roll resetting portion of this apparatus is operative only when the automatic thickness control apparatus is not and thus only when there is no bar in the rolling mill. The reason for this will be apparent because when the automatic thickness control apparatus is operative it serves to control the operation of the screw-down motors and therefore the roll resetting apparatus should not and cannot then be operative.

The automatic control for discontinuing the effective operation of the thickness control apparatus and for at the same time initiating the effective operation of the roll resetting apparatus is only partially illustrated, and comprises a relay 65 having a coil 66 and a pair of armatures 67 and 68. One terminal of coil 66 is connected to the power line L2 by a conductor 70. The other terminal of the coil 66 is connected by a conductor 71 to an indicator apparatus A which indicates whether or not a bar is in the mill and when a bar is in the mill provides electric current from the power line L1 to the conductor 71 through the master switch 31, a conductor 72 and itself. When coil 66 is thus energized armatures 67 and 68 are in the position shown in Fig. 1 and serve to complete a circuit through an automatic thickness control apparatus B by connecting it to the power line L1 through a conductor 73 connected to power line L1, armature 68, a conductor 74 connecting the armature to the thickness control apparatus and a conductor 75 connecting the thickness control apparatus to power line L2.

When there is no bar in the mill, coil 66 of relay 65 is deenergized because the circuit through its coil 66 is opened by the bar-in-mill indicator A and armatures 67 and 68 move to the left as shown in Fig. 1, armature 67 thereby contacting a contact 76 connected to the power line L1 through a conductor 77 and conductor 73.

A relay 78, the coil 79 of which is connected across the connecting conductors 24 and 25 of the servo transmitter and servo receiver and is therefore energized when the latter are electrically locked together, that is, when the master switch 31 is closed, has a pair of armatures 80 and 81 alternately connectable to a conductor 82 which is in turn connected to the armature 67 of the relay 65. The armature 80 normally is the one which is in contact with the conductor 82 and through the conductors 83 and 84 is respectively connected to the switch contacts 55 and 41 of the multiple switches 35 and 34. It will be understood from the above descriptions of switches 34, 35 and of cams 32, 33 that only one at a time can be operated, and that when the coil 66 of relay 65 is deenergized and coil 79 of relay 78 is energized, and either of these multiple switches is operated by the lifting of its cam follower 46 or 60 onto the dwell 32a or 33a of the corresponding cam 32 or 33, current from the power line L1 will be provided either to coil 15a of relay 15 or to coil 19a of relay 19.

When the multiple switch 34 is the one that is operated and the above conditions exist, coil 19a will be energized by reason of its connection to power line L1 through relay 65, relay 78, conductor 84, closed contacts 41 and 40, a conductor 85 connecting the contact 40 of switch 34 to contact 56 of switch 35, switch arm 51 which connects contacts 56 and 57 of switch 35 when this switch is not operated and is in its position shown in Fig. 1, and a conductor 86 connecting contact 57 to coil 19a. Coil 19a is connected to power line L2 through a conductor 87 and a conductor 88, the latter conductor also connecting one terminal of the coil 15a of relay 15 to the power line L2. When the coil 19a is energized armature 19b serves to connect the screw-up motor 11 to the power line L1 through the conductor 17.

When the multiple switch 35 is operated, coil 15a of relay 15 is connected to the power line L1 through relay 65, relay 78, conductor 83, closed switch contacts 55 and 54, a conductor 89 connecting the switch contact 54 of the switch 35 to the switch contact 43 of the switch 34, closed contacts 42 and 43 of the switch 34, and a conductor 90 connecting switch contact 42 with coil 15a. When the relay coil 15a is thus energized the armature 15b serves to connect the screw-down motor 10 with the power line L1 through the conductor 13.

The above described apparatus comprises that which is necessary to reset the screw-down motors and therefore the spacing of the rolls of the rolling mill to their normal spacing after a bar has been rolled by the mill. Its operation is as follows. As shown in Fig. 1 the following conditions obtain. The rolls of the rolling mill are at their normal spacing as indicated by the position of the cams 32 and 33, whereby neither of the multiple switches 34 and 35 is operated. A bar is in the mill as indicated by the energized condition of the relay 65 and the automatic thickness control gauge is therefore operating to control the thickness of the bar in the mill, and thereby is controlling the operation of the screw-down motor 10 and screw-up motor 11 through appropriate connections not forming a part of the subject invention and so not shown.

These conditions, with the possible exception of the position of cams 32 and 33, exist until the bar leaves the mill. When the latter occurs the relay 65 is deenergized thereby supplying current to the electric circuits of the reset control apparatus and at the same time discontinuing the operation of the thickness control apparatus. If the rolls of the rolling mill have had a net relative movement from their normal spaced setting during the rolling of the bar this net movement will be indicated by cams 32 and 33 which are rotated in response to operation of the screw-down motor 10 or screw-up motor 11 through the servo transmitter and the servo receiver. If the net movement resulted in the rolls being closer together than when they were at their normal spaced setting the cam 32 will have been turned to operate the switch 34 against the spring 47, thereby connecting the relay coil 19a to the power line L1, as above described, which results in the supplying of power to the screw-up motor 11. The cam 33 will have also been turned but will not have caused the switch 35 to operate. Thus, the rolls of the mill will be moved apart and such movement will continue until they have been returned to their normal spaced setting, at which time the cam 32 will have been returned to its position shown in Fig. 1 and switch 34 will have resumed its inoperative position. The relay 19 is then deenergized and the supply of current to screw-up motor 11 discontinued. If on the other hand, after the bar leaves the mill the rolls are farther apart than when at their normal spaced setting, the cam 33 will have been rotated to operate the multiple switch 35 thereby connecting the coil 15a of the relay 15 to the power line L1 through the connections above described, and the energization of the coil 15a will result in current being provided to the screw-down motor 10 which will operate to move the rolls closer together until they have reached their normal spaced setting at which time the cam 33 will have been returned to its position shown in Fig. 1 and the relay 15 deenergized.

It will be apparent from the above description that, after each bar has been rolled by a rolling mill, the reset control apparatus serves to automatically reset the rolls of the mill to the normal spaced setting of them obtaining prior to the entry of a bar into the mill. Therefore, the rolls always have the same relative spaced setting at the beginnings of the rollings of successive bars.

Sometimes, during the course of rolling a bar under the control of the automatic thickness control apparatus it is desirable to adjust or change the normal spaced setting of the rolls of the rolling mill to obtain a better thickness gauge indication. This may be accomplished by any desirable means but for convenience push buttons 14 and 18 have been illustrated whereby screw-down motor 10 and screw-up motor 11 may be manually energized respectively to move the rolls closer together or farther apart. In this event it is, of course, therefore necessary to reset cams 32 and 33 so that when they are in a position such as shown in Fig. 1 they will represent or indicate the new normal spaced setting of the rolls.

For this purpose a reversible two-winding motor 100 is provided which is connected by suitable gearing and a drive shaft 101 to the servo receiver 22 so that when it is operated it will serve to rotate cam shaft 23. The common winding terminal 102 of the two-winding motor 100 is connected to the power line L2 through a conductor 103 connected to a conductor 104 of relay 79 which in turn is connected to connecting conductor 25 of the servo system. A winding terminal 105 of the two-winding motor 100, which when it is connected to the power line L1 serves to drive the motor in one direction, is adapted to be connected to that power line through a conductor 106 connected to the switch contact 44 of the multiple switch 34, the switch arm 38 of the switch connecting the switch contact 44 to the switch contact 45, and a conductor 107 connecting the latter switch contact to the armature 81 of relay 78. The other winding terminal 108 of the two-winding motor 100, which when connected to line L1 serves to operate the two-winding motor in the other direction, is connected to that power line through a conductor 109 connecting it to the switch contact 59 of the multiple switch 35, the switch arm 52 connecting the switch contacts 59 and 58, and a conductor 110 connecting the switch contact 58 to the conductor 107. It will thus be apparent that when the conductor 107 is connected to the power line L1, the two-winding motor 100 will be driven in one direction or the other depending upon which of the multiple switches 34 and 35 is operated and, when neither switch is operated, will not be driven at all because the driving forces applied to it will be the same in both directions.

When, during the course of rolling a bar in the mill under automatic control, it is desired to adjust the rolls to a new normal spaced setting the push button 14 or the push button 18 may be operated. In view of the fact that the servo transmitter and the servo receiver are locked together for automatic operation, the cam shaft 23 will be rotated thereby causing either the multiple switch 34 or the multiple switch 35 to be operated by their respective cams depending upon whether the new normal spaced setting is to be one in which the rolls are closer together or farther apart. When the rolls have been moved to their new normal spaced setting the master switch 31 is opened and therefore the servo transmitter and the servo receiver are unlocked. Additionally, the relay 65 is deenergized thereby discontinuing the operation of the automatic thickness control apparatus and at the same time connecting the conductor 82 to the power line L1. The unlocking of the servos deenergizes the relay 78 whereby the armature 81 thereof moves into contact with the conductor 82, and the conductor 107 for the two-winding motor is energized by connection to the power line L1. Depending upon which of the multiple switches 34 and 35 is operated in response to the movement of the cams 32 and 33, the two-winding motor is operated in one direction or the other to rotate the cam shaft to a position at which neither the switch 34 nor the switch 35 is operated, as shown in Fig. 1, at which point both of the windings connected to terminals 105 and 108 of the two-winding motor 100 will be energized and thus the operation of the motor will cease, because power is then applied equally to both windings. After this adjustment of the cams to the new normal spaced setting of the rolls, master switch 31 may be closed and the rolling of the bar in the mill proceeded with.

Changing of the normal spaced setting of the rolls when there is no bar in the mill is a considerably simpler matter. As will be apparent, the provision of a two-winding motor for this purpose is not necessary. After a bar has left the mill the automatic reset control will return the rolls of the mill to their original normal spaced setting. Hence, the cams 32 and 33 will be returned to their positions as shown in Fig. 1. To change the normal spaced setting of the rolls, master switch 31 may be opened to unlock the servos and the screw-down or screw-up motor operated by the push buttons 14 or 18 until the new normal spaced setting is reached and then the master switch closed again to relock the servos together.

Figure 2:
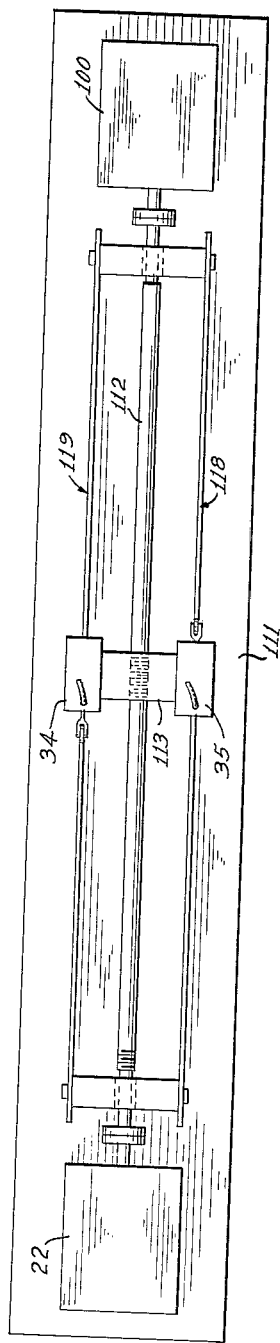
Fig. 2 is a plan view of a portion of a modified position-responsive and registering means, and, Fig. 3 is an elevation of the modified form of apparatus of Fig. 2, partly in section.
Figure 3:
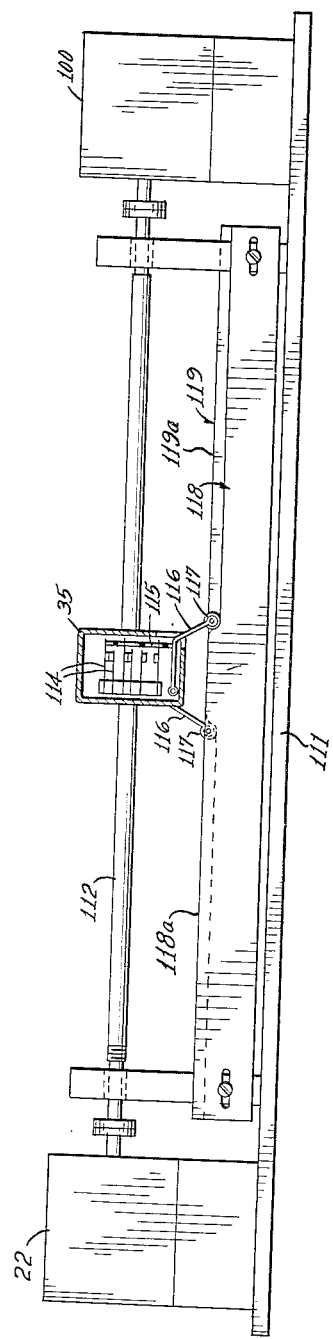

Turning now to Figs. 2 and 3 an alternate form of cam responsive means is illustrated which may be substituted for cams 32 and 33 of Fig. 1. This apparatus comprises a base 111 upon which are mounted the servo receiver 22 and the two-winding reversible motor 100. Between these and driven by either one, as the case may be, is a threaded shaft 112 upon which is supported and to which is threadedly connected a carriage 113 which supports the multiple switches 34 and 35 on opposite sides of the shaft 112. Rotation of the shaft 112 by either the servo receiver or the two-winding motor in one direction moves the carriage to the left as seen in the drawings and rotation of the shaft 112 in the other direction moves the carriage to the right as seen in the drawings.

The switches 34 and 35, as was the case in Fig. 1, are identical to one another. Each comprises three pairs of contacts the upper two of which are normally closed, the lower pair being normally open. The contact supporting arms 114 are engaged by an insulated rod 115 which when moved upwardly opens the two upper pairs of contacts and closes the bottom pair. The rods 115 are moved by arms 116, each arm being pivotally supported at one end within its switch housing and carrying on its lower end a cam follower 117. A pair of similar cams 118 and 119 are mounted on base 111 of the apparatus and are respectively engaged by cam followers 117. The dwells of cams 118 and 119 are oppositely disposed lengthwise of the apparatus, that is the dwell 118a of the cam 118 extends from slightly beyond the middle of the cam 118 to its left-hand end, as seen in the drawings, and the dwell 119a of the cam 119 extends from slightly beyond the middle to its right-hand end as seen in the drawings.

When the carriage 113 is in the position shown in Figs. 2 and 3 neither of the switches 34 or 35 is operated and this position corresponds to that shown in Fig. 1 for cams 32 and 33 and switches 34 and 35. However, operation of the servo receiver by the servo transmitter will cause the carriage 113 to move either to the right or left as the case may be, and thus, switch 34 or 35 will be operated. It will be apparent, of course, that as was the case with switches 34 and 35 of Fig. 1, both of the switches 34 and 35 of Figs. 2 and 3 cannot be operated at the same time. The electric connections for the apparatus of Figs. 2 and 3 will, of course, be identical with those shown in Fig. 1 and described in connection therewith, it being understood that the apparatus of Figs. 2 and 3 merely replaces the cam apparatus of Fig. 1 if desired.

One of the advantages of the cam indicating means of Figs. 2 and 3 over that of Fig. 1 is that while in the latter movement of the rolls of the mill to their limiting positions must not result in more than one-half a revolution of the cam shaft 23, in the former it may result in a great many more rotations of the cam shaft 112. Somewhat greater accuracy, therefore, is permitted by the use of the apparatus of Figs. 2 and 3.

Various changes may, of course, be made in numerous features of the apparatus described without departing from the scope of the invention and it should therefore be understood that the invention should be limited only to the extent set forth in the appended claims. In this respect it will be noted that in some of the appended claims the apparatus is set forth as being one for resetting the spaced rolls of a rolling mill, but it will be obvious to those skilled in the art that it might be equally well suited for resetting any pair of spaced members to a predetermined spaced setting with respect to each other after they have taken part in an operation during which they have been moved relative to each other. Therefore, we do not wish to be limited to the present example of the invention as applied to elements of a rolling mill.

We claim:

1. Electric control apparatus for resetting a pair of spaced members to a predetermined spaced setting with respect to each other after they have participated in an operation during which they have been relatively moved from said setting, which comprises electric motor means coupled to at least one of said members so as to provide relative movement of the members to change the spacing therebetween, position-responsive transmitting and receiving means adapted to register the net movement of the motor means in either direction during said operation, said transmitting means being coupled to and driven by said motor means, an electric power source, connections from said position-responsive means to the power source, electric circuit means including switching devices operable to connect said motor means to said power source, timing mechanism disposed to operate said switching devices, said timing mechanism being coupled to and operative selectively in response to movement of said position-responsive receiving means in either of two directions, and adjusting means adapted to set said position-responsive means to register zero net operation for the motor means when said members are at their predetermined normal relative spacing.

2. In an electric control apparatus for resetting a pair of spaced members to a predetermined normal relative spaced setting, including electric motor means coupled to at least one of said members for moving them relatively in either of two opposite directions from said setting, a source of electric current, first relay circuit means including a first relay which when energized connects said source to said motor means so as to move said members relatively in one direction, second relay circuit means including a second relay which when energized connects said source to said motor means so as to move said members relatively in the opposite direction, position-responsive means responsive to operation of said motor means and which registers the net directional operation of said motor means during an operation in which said members are moved toward or away from each other, cam means actuated by said position-responsive means and having a dwell position representing said normal setting of said members, and switch means actuated by said position-responsive means for alternatively energizing said first and second relay circuit means.

3. In an electric control apparatus for resetting a pair of spaced members to a predetermined normal relative spaced setting, including electric motor means coupled to at least one of said members for moving them relatively in either of two opposite directions from said setting, a source of electric current, first relay circuit means including a first relay which when energized connects said source to said motor means so as to move said members relatively in one direction, second relay circuit means including a second relay which when energized connects said source to said motor means so as to move said members relatively in the opposite direction, position-responsive means responsive to operation of said motor means and which registers the net directional operation of said motor means during an operation in which said members are moved toward or away from each other, cam means actuated by said position-responsive means and having a dwell position representing said normal setting of said members, switch means actuated by said position-responsive means for alternatively energizing said first and second relay circuit means, and means for setting said position-responsive means to register zero net operation of the motor means when said members are positioned at said normal relative spaced setting.

4. Apparatus according to claim 2, in which said cam means include a pair of cams and followers therefor, said cams having dwell positions which are operative simultaneously at said normal setting, and said followers are arranged to actuate said switch means.

5. Electric control apparatus for resetting a pair of spaced members to a predetermined normal spaced setting with respect to each other after they have participated in an operation during which they have been relatively moved from said setting, which comprises electric motor means coupled to at least one of said members so as to move them relatively in either of two opposite directions from said setting, position-responsive transmitting means coupled to and driven by said motor means, an electric power source, electric circuit means including a pair of switching devices operable respectively to connect said motor means to said power source to provide relative movement of said members in either direction, selectively, cam mechanism including a base, a pair of linear cams supported on said base, a rotatable threaded shaft mounted over said base longitudinally thereof, a carriage mounted on said shaft so as to be moved therealong relatively to the cams by rotation of the shaft, said carriage carrying said switching devices and a pair of cam followers each cooperating with a cam and a switching device, respectively, reversible motor means coupled to said shaft so as to rotate the same, position-responsive receiving means connected to operate in either of two directions in response to operation of said transmitting means, means coupling said receiving means to said shaft so as to rotate the same, and control means included in said electric circuit means and connected to said position-responsive means and to said switching devices so as to energize said reversible motor means only when said position-responsive receiving means is deenergized.

6. Apparatus according to claim 1, in which said adjusting means comprises first switch means operable to disconnect the position-responsive means from the power source, and second switch means operable to connect said motor means to said power source for operation in either direction, selectively.

7. Electric control apparatus for resetting a pair of spaced members to a predetermined normal spaced setting with respect to each other after they have participated in an operation during which they have been relatively moved from said setting, which comprises electric motor means coupled to at least one of said members so as to move them relatively in either of two opposite directions from said setting, position-responsive transmitting means coupled to and driven by said motor means, an electric power source, electric circuit means including a pair of switching devices operable respectively to connect said motor means to said power source to provide relative movement of said members in either direction, selectively, a pair of cams each disposed to actuate one of said switching devices, said cams having dwell positions which are operative simultaneously at said normal setting, position-responsive receiving means connected to said transmitting means so as to operate in either of two directions in response to operation of said transmitting means, means coupling said receiving means to said cams to operate the same, connections including first manually operable switch means between said power source and said position-responsive means for energizing the latter, reversible motor means coupled to said cams in common with said receiving means to drive said cams in either direction, relay means actuated in response to opening said first manually operable switch, connections from said reversible motor means to said power source through said relay means and said switching devices so that said motor means is operated in one direction or the other in response to the operation of one or the other of said switching devices, respectively, and additional manually operable switch means for connecting said power source to said electric motor means to operate the latter in either direction, selectively, when said first manually operable switch means is open.

References Cited in the file of this patent
UNITED STATES PATENTS

| 2,106,965 | Wright et al. | Feb. 1, 1938 |
| 2,446,393 | Russell | Aug. 3, 1948 |
| 2,448,657 | Buckman | Sept. 7, 1948 |
| 2,618,771 | Stanley et al. | Nov. 18, 1952 |